H. M. NEUHAUS.
HAY LOADER.
APPLICATION FILED MAY 20, 1918.

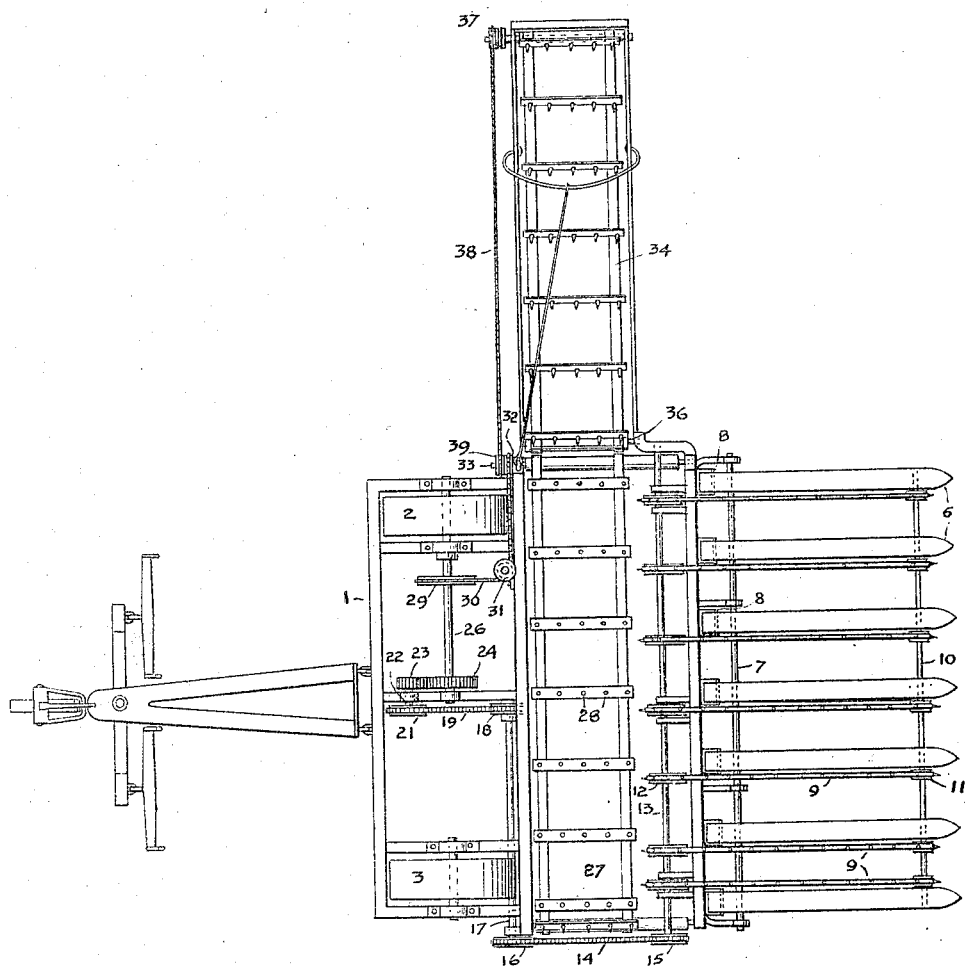

1,293,517.

Patented Feb. 4, 1919.
2 SHEETS—SHEET 2.

INVENTOR
H. M. NEUHAUS

BY *F. M. Wright*
ATT'Y.

UNITED STATES PATENT OFFICE.

HENRY M. NEUHAUS, OF SUSANVILLE, CALIFORNIA.

HAY-LOADER.

1,293,517.

Specification of Letters Patent.

Patented Feb. 4, 1919.

Application filed May 20, 1918. Serial No. 235,668.

*To all whom it may concern:*

Be it known that I, HENRY M. NEUHAUS, a citizen of the United States, residing at Susanville, in the county of Lassen and State of California, have invented new and useful Improvements in Hay-Loaders, of which the following is a specification.

The present invention relates to a machine for loading hay on to a wagon from the field and is an improvement on the invention for which United States Patent No. 889,392, was granted to me on the second day of June, 1908, the object being to simplify the construction there shown.

Figure 3:
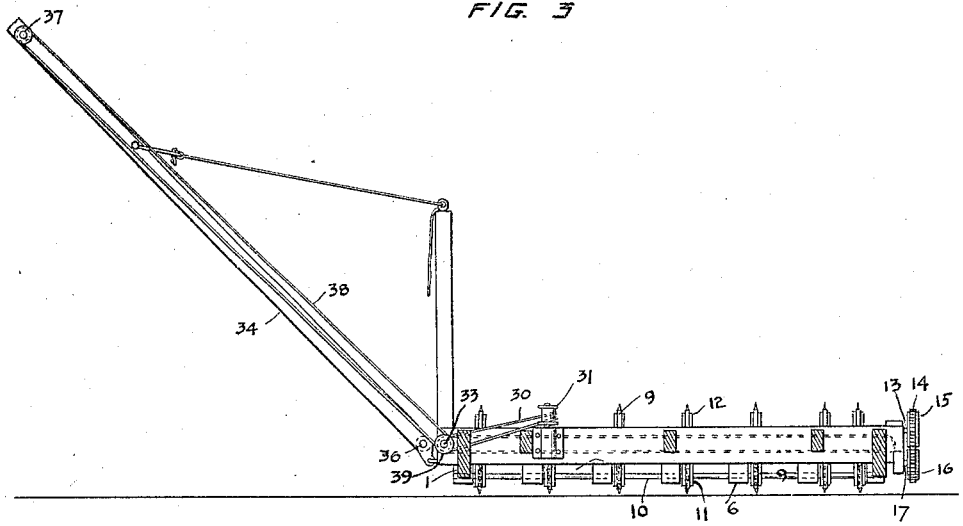
Figure 2:
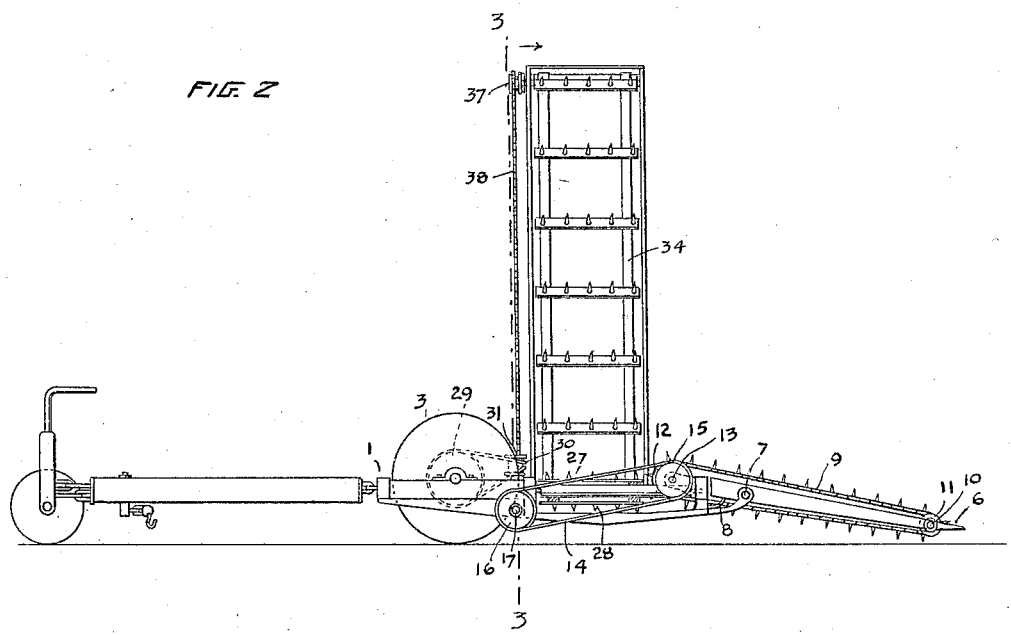

In the accompanying drawings Figure 1 is a plan view of the machine; Fig. 2 is a longitudinal section of the same; Fig. 3 is a transverse section of the same on the line 3—3 of Fig. 2.

Referring to the drawing, 1 indicates the frame of the machine which is mounted on drive wheels 2, 3, and to the rear of which is connected the mechanism for propelling and steering the machine over the ground which is the same as disclosed in the patent above referred to.

6 indicates teeth of a fork pivotally mounted upon a cross-bar 7, their rear ends abutting against the upper edges of spring plates 8, which allows of a certain freedom of movement of said teeth as they move over uneven ground. The fork passes beneath the hay as the machine travels, and the hay is then drawn back from the fork by means of endless chains 9, one for each tooth, which travels around small front sprocket wheels 11, mounted to rotate on a shaft 10 secured in the teeth 6 near their front ends, and rear sprocket wheels 12 mounted on a transverse shaft 13 to the rear of the teeth and having bearings in the frame 1. From every other link of each chain 9 extends outwardly a tooth or finger two inches long. To one end of said transverse shaft is secured a sprocket wheel 15 around which travels a sprocket chain 14 which also travels around a sprocket wheel 16 on a transverse shaft 17, which carries, near the center of the frame, a sprocket wheel 18 around which travels a sprocket chain 19, said chain also traveling around a sprocket wheel 21 on a short transverse shaft 22, which carries a pinion 23 which meshes with a gear wheel 24 upon a transverse shaft 26 upon which is mounted the driving wheel 2. It will be seen that, with this arrangement, as the hay loader is propelled over the ground, the upper portions of the sprocket chains 9 are continually carrying backward the hay lifted from off the ground by the teeth 8.

By said chains the hay is deposited on to a draper 27 provided with rows each of five teeth or pins 28, 2 inches long. Said draper 27 is operated in a manner similar to that described in the patent referred to, that is to say, by means of a sprocket wheel 29 on the shaft 26 driven by a sprocket chain 30 passing around idler wheels 31 and around a sprocket wheel 32 on a shaft 33. By this draper the hay is conveyed to an inclined draper or elevator 34, pivotally attached, as shown at 36, to the frame of the machine, and which can be inclined at any angle, and by which the hay may be delivered to the wagon, said elevator being driven in like manner by a sprocket wheel 37 and a sprocket chain 38 from a sprocket wheel 39 upon the same shaft 33.

I claim:—

In a hay loader, the combination with a frame and drive wheels, of a shaft arranged transversely to the direction of movement of the hay loader, teeth, spaced from each other and pivotally supported upon said shaft, means for resiliently supporting said teeth behind said shaft, sprocket wheels on said shaft outside of, but closely adjacent to, said teeth, a shaft carried by said frame, means operated by said drive wheels for rotating said latter shaft, sprocket wheels on said last-named shaft, and sprocket chains around said last-named and first-named sprocket wheels.

HENRY M. NEUHAUS.

Copies of this patent may be obtained for five cents each, by addressing the "Commissioner of Patents, Washington, D. C."